United States Patent [19]

Burlet et al.

[11] Patent Number: 4,830,699

[45] Date of Patent: May 16, 1989

[54] PROCESS AND DEVICE FOR REMOVING OBJECTS FROM THE OUTSIDE OF CONTAINERS

[75] Inventors: Rudolf J. H. Burlet; Lambertus M. J. Tabor, both of Geleen, Netherlands

[73] Assignee: Stamicarbon B.V., Geleen, Netherlands

[21] Appl. No.: 24,480

[22] Filed: Mar. 11, 1987

[30] Foreign Application Priority Data

Mar. 11, 1986 [NL] Netherlands .......................... 8600627

[51] Int. Cl.⁴ ............................................ B32B 31/16
[52] U.S. Cl. ........................................ 156/344; 15/60; 15/61; 156/154; 156/584
[58] Field of Search ................. 15/60, 61; 134/17, 19; 156/154, 344, 584

[56] References Cited

U.S. PATENT DOCUMENTS

| 3,534,428 | 10/1970 | Pugh et al. | 15/60 X |
| 4,033,804 | 7/1977 | Baldyga | 156/344 X |
| 4,715,920 | 12/1987 | Ruppman et al. | 156/344 |

*Primary Examiner*—Robert A. Dawson
*Attorney, Agent, or Firm*—Cushman, Darby & Cushman

[57] ABSTRACT

Process and device for delabeling of plastic containers by immersing them in a liquid bath heated to above the disorientation temperature of the containers and thereafter separating the loose labels (optionally cups) from the container bodies by bringing them on an inclined sieve vibrating in such a way that when the screen deck is in its highest position in the vibrating motion, the component of motion parallel to the screen deck is directed toward the highest point of the screen.

12 Claims, 1 Drawing Sheet

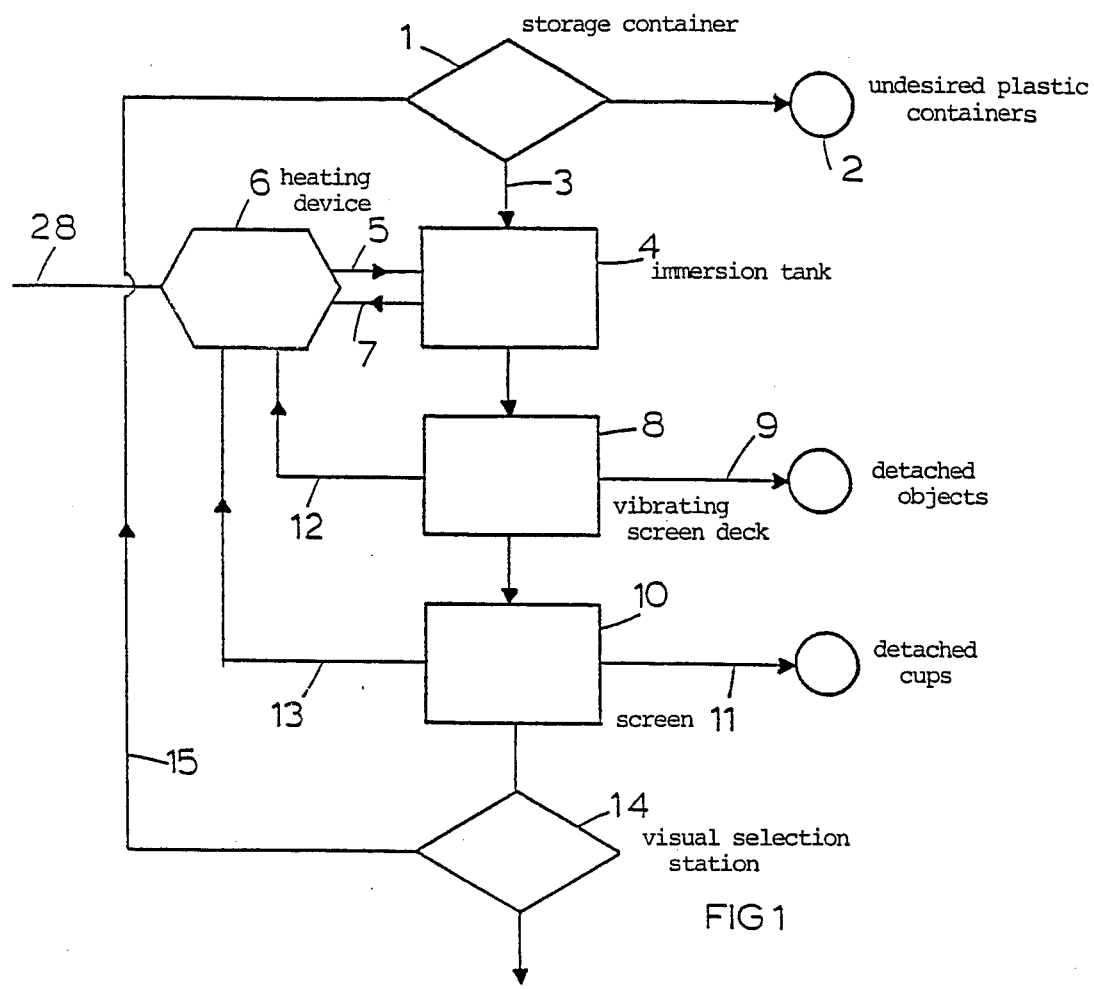
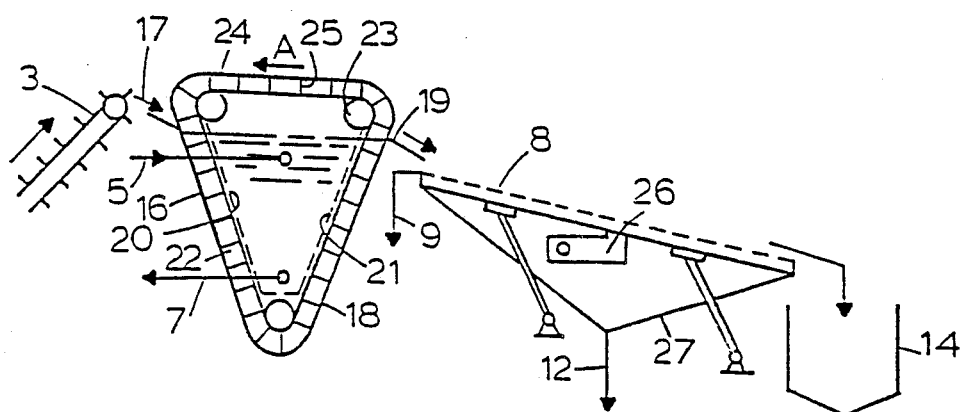

PROCESS AND DEVICE FOR REMOVING OBJECTS FROM THE OUTSIDE OF CONTAINERS

The invention relates to a process and a device for removing from containers objects glued thereto, such as labels, which containers are made of a plastic brought into a state of molecular orientation and are heated, at least at the places where the objects occur, to such a high temperature that, in consequence of the disorientation of the plastic, the containers will shrink at these places.

In the packaging industry increasing use is made of containers, such as bottles, that are made by the deformation of a thermoplastic material at a temperature above its glass transition temperature, at which the plastic is in the so-called rubberlike state. The polymer molecules, which do not have a preferred direction in their natural position, are oriented in that process. By rapidly cooling the object after the shaping, which consists, for instance, in the blowing of a pipe or an injection-moulded article in a mould or in the deep-drawing of a sheet of the plastic in a mould cavity, it will retain the acquired shape, and the molecular orientation and the greater strength connected therewith will be retained.

The advantages of the use of plastic over that of glass as packaging material are, inter alia, a lighter weight, lower fragility, no danger of explosion with containers for carbonated drinks and less noise in the filling, transportation and storage of the containers. An objection raised against the use of plastics is that, if used only once, the amount of waste will increase and the consumption of energy in the production process will be higher than with glass containers, which are used more than once. These higher energy costs might be reflected in a higher price of the product packed in so far as they are not compensated by the advantages of the use of plastic.

A major advantage of glass is that it is impermeable to gases and liquids and resistant to chemicals. Nor can any components of the glass be absorbed by the contents of the container. With plastics the nature of the product to be packed must be taken into account. In certain cases no plastics must be used that dissolve in hydrocarbons, and in other cases a plastic must be used having a high impermeability to gases, for instance in the case of bottles for carbonated drinks, so-called soft drinks. The costs for the production of these special plastics are substantially higher than those of the usual plastics on which no special demands are made. Besides the environmental aspect, it is in this connection, therefore, the cost factor that plays an important part, which factor argues in favour of the recycling of used containers.

For the recycling the following possibilities are available:
(a) recycling of the containers,
(b) burning of the containers,
(c) pyrolysis, and
(d) re-processing of the plastic.

(a) The recycling of the containers requires the implementation of a deposit system and the collection and careful cleaning of the containers. All this is rather labour-intensive, for which reason non-returnable packaging materials have increasingly come to be used in the field of glass containers, too.

(b) In burning, the heat of combustion of the mineral oil used in the production of the containers is recovered. Consequently, for the production of the replacement containers new raw materials must be used. Moreover, in applying this method obstacles will be encountered when, in consequence of the burning, an emission of noxious substances into the atmosphere takes place, as in the burning of polyvinyl chloride.

(c) In pyrolysis the plastics are decomposed to form their monomers, which are subsequently polymerized again and processed to form the desired articles. This does result in a saving of raw materials, but the decomposition of the polymers followed by re-polymerization constitutes a time-consuming process, of course.

(d) In re-processing, the containers used are brought, by physical means, into a form suitable for again making articles thereof. These need not be containers, of course, but may also be articles of a different kind suitable for being produced from the recycled plastic.

This last-mentioned method is highly attractive, because it in principle amounts to the division, by breaking, cutting, grinding or such like reduction methods, of used containers into parts of such dimensions that they can be processed by the processing machines. In practice, however, it has been found that it is very difficult, if not impossible, in this manner to obtain a product the properties of which correspond with those of the original material. This is due to foreign materials that have found their way into the reprocessing. These foreign materials may consist of containers of a different polymer, screw caps, labels, so-called base cups that are glued under the spherical undersides of containers blown from an injection mould, as well as the remainders of the adhesive with which the labels and base cups were glued to the containers.

By collecting selectively, for instance by the introduction of a return system or by sorting later on, containers of a particular plastic can be brought together. In doing so any screw caps that may yet be present can be removed as well. For the removal of lables it is known to pass the containers one by one along an abrading device (U.S. Pat. No. 4,013,497) or along a device where the containers are irradiated by a source of heat at a place where a label is present, so that the container will shrink at this place (U.S. Pat. No. 3,044,804). The disadvantage of these known methods is that identical containers must be supplied to the device separately in a particular position, and that these containers must not be deformed, because otherwise the surfaces to be treated will make insufficient or no contact with the abrading device or the source of heat. It is further known (U.S. Pat. No. 4,209,344) to strip plastic bottles of labels by immersing the bottles in water of 49°–66° as a result of which the labels are soaked from the bottles. The object of this method is to recover the bottles undamaged for re-use. The disadvantage of this batchwise process is that the time required for the soaking off is relatively long.

As the containers take up a rather large amount of space, it is an advantage, with a view to the transport and storage of the collected containers, for them to be pressed into bales at the place where they are collected, which bales are wrapped with a band and in this condition conveyed to the place where they are processed. There, after removal of the wrapping bands, the bales will fall apart again into individual containers or smaller groups of containers. In consequence of the great forces exercised on the containers during the compacting, these have been so deformed that, after the unloading of the bales, they will not regain their original shapes. As a result, with these containers the known methods for loosening labels and the like cannot be applied. Consequently, the known methods have the disadvantage that the containers must be stored and be transported to the place where they will be processed in a voluminous state.

The invention provides a process that does not have these disadvantages. This has been achieved by immersing the containers or groups of containers in a liquid the temperature of which is about the same as or higher than the disorientation temperature of the plastic used for the production of the containers and the softening temperature of the adhesive used for the fastening of the objects, upon which the containers and the objects that have become detached from these are mechanically divided into separate fractions. The containers to be dealt with may now be different from each other in shape and size, so that the containers to be dealt with can, without any problem, be compacted to form bales at the place where they are collected. Further, individual containers as well as groups of containers can be supplied to the liquid bath in any position. Yet another advantage is that any remainders of the contents of the containers left behind in the containers are washed away by the bath liquid.

In the liquid bath the containers are thoroughly heated to a temperature at which the plastic is in such a state that the tensile stresses frozen in during the production of the containers are released, so that the containers will shrink, a well-known phenomenon used, for instance, with the so-called shrink wrappings. The labels stuck on the containers and any base cups are not liable to this deformation, so that, partly as a result of the soaking and/or dissolving action of the liquid, they will become detached.

The invention can be applied with particular advantage in the processing of special plastics, such as polyethyleneterephthalate or copolymers thereof, which latter plastics combine a great strength with a very low permeability to gases. Particularly in the bottling of carbonated drinks a pressure may occur in the bottle which, when using glass bottles, not infrequently caused the bottle to explode. By using bottles of polyethyleneterephthalate these dangers are avoided and it is possible also for bottles to be used having a volume substantially larger than permissible in the case of glass bottles. Particularly the recovery of this special plastic is very important.

The glass transition temperature of polyethyleneterephthalate is about 7° C. As the softening process of a plastic takes places in a certain range, some distortion of the plastic may occur already below this glass transition temperature. It has been found that in the treatment of containers from polyethyleneterephthalate the shrinking results are good when the containers are immersed in a water bath with a temperature of at least 70° C.

It has surprisingly been found that heating of the water bath up to the boiling point of the water used has a very favourable effect on the labels of the containers coming loose and remaining loose. This can probably be caused by the continuous formation of bubbles on the surface of the containers during the boiling.

For the heating of the water preference is given to the use of superheated steam supplied to the water direct. The advantage is that the heat content of the steam can be taken full advantage of and that the condensed steam also, at least in part, serves to supplement the water requirement.

The device for carrying out the process according to the invention consists of an immersion tank provided with a feed and an outlet for the containers and with means to keep the liquid in this tank at the desired temperature and with a device containers to the outlet of the immersion tank for separating the containers from the objects that have become detached from them.

In a preferred embodiment the immersion tank consists of a substantially triangular tank having the point directed downwards, in which tank is provided a rotating conveyor fitted with carriers, the lower portion of which can move through a channel formed between the oblique walls of the immersion tank and a grating or sheet provided in the tank at some distance from these walls, which channel is connected at or near the top edge of one oblique wall to the feed of the containers to be treated and at or near the top edge of the other oblique wall to the outlet of the containers treated and the objects that have become detached therefrom.

When the containers or groups of containers are immersed in the liquid heated to or above the glass transition temperature of the plastic, they will take on this temperature in all places fairly rapidly, so that the plastic will enter the so-called rubber-like range. The molecules of the plastic, which were oriented after the shaping, now largely adopt their entangled form again, in consequence of which the containers shrink and in the process acquire a diameter and length substantially smaller than what they originally had. The objects fastened to the containers, such as labels and base cups, do not undergo this change, so that they become detached from the containers. Containers that have become entangled in the baling process and form groups will also become detached from each other as a result of the shrinking and the drawing of the containers. The outlet of the immersion tank now contains a mixture of containers and the said loose objects.

The device for separating the containers from the objects that have become detached therefrom into separate fractions preferably consists of an inclined vibrating screen, the feed of which is provided at or near the highest point of this screen, which vibrating screen is so connected with the driving device that, when the screen deck is in its highest position in the vibrating motion, the component of motion parallel to the screen deck is directed towards the highest point of the screen.

Surprisingly, on this vibrating screen a separation takes place between the labels and the containers and other objects. Without being bound to it, the following explanation might be supposed for this phenomenon. The containers and base cups raised in the upward movement of the screen deck will come loose from this screen deck in the downward movement, because in the beginning of this downward movement it has an acceleration greater than that of gravitation. As the vibrating motion also has a component of motion parallel to the plane of the screen deck, these parts will fall back onto the screen deck in a place different from where the upward movement started. Consequently, transport of the containers and base cups take place, and that, in the chosen vibrating motion, into the direction of the lower end of the screen, which transport is even promoted by the shape of these parts in combination with the slope of the screen deck.

Owing to their flat shape, the labels will not come loose, but will continue to be in contact with the screen deck. When, after having passed its highest position, the screen deck now has a component of motion directed towards the top edge of the screen, the labels will receive an impuls into the direction of that edge and will move on into that direction when the screen deck moves back, as in the transport by means of a shaking conveyor. As a result, the labels will move over the screen deck into a direction opposite to that of the containers. At its discharge end the screen may optionally be provided with openings of such a diameter as to allow base cups to pass through these.

The invention is further elucidated with reference to the example of the embodiment shown in the drawing.

FIG. 1 is a diagram of the process according to the invention;

FIG. 2 shows a device for carrying out the process according to the invention.

Bottles pressed into bales and/or loose bottles provided with labels and base cups glued on to them are fed to a storage container 1. In the process the wrapping bands are taken from the bales and bottles of a non-desired plastic are removed at 2. The process is intended, for instance, for treating containers of polyethyleneterephthalate (PET). Using a conveyor belt 3, the single bottles and groups of bottles are supplied to an immersion tank 4. Into this tank is fed, through line 5, from a heating device for liquids 6, water with a temperature above 90° C. Pipes for the supply of superheated steam can be led direct into the water bath. Return water is recirculated through line 7 to heater 6. In tank 4 the bottles are immersed completely, so that they are heated uniformly to the temperature of the liquid. As set forth hereinbefore, the bottles shrink at this temperature and the labels and bottom pieces become detached from the bottles.

The mixture of bottles, labels and base cups carried off from the immersion tank is deposited on a vibrating screen 8. On it the detached labels are separated off and carried off at 9. The remaining bottles and base cups are passed over a screen 10, the mesh of which is so wide as to allow the cups to fall through. These are carried off at 11. The transport over screen 10 can be effected with the aid of a scraper not represented in the drawing. The water carried off through vibrating screen 8 and screen 10 is returned through lines 12 and 13 to the heating device for liquids 6. The bottles stripped of the objects attached to them are collected at 14, where they may yet be subjected to a visual selection. Bottles not properly separated off can then be returned by a conveyor 15 to storage container 1.

The selected bottles can further be ground as known in the art and be liberated by floatation or foaming from foreign plastics and residual adhesive, upon which the purified plastic parts are washed and dried in order to make them suitable for the production of containers or other articles.

In vertical cross section immersion tank 4 has the form of a triangle with the point in downward direction (FIG. 2). The oblique front wall 16 is connected at the top to a feed channel 17 and the oblique rear wall 18 is connected at the top to a discharge channel 19. At some distance from the front wall and the rear wall gratings 20 and 21 are provided in the tank parallel to these walls, so that between these walls and the gratings a channel 22 is present. At or near the ends of the gratings chain wheels 23 are so fitted as to be capable of rotating, over which chain wheels chains 24 are passed. At each angular point there are two chain wheels. Between the two chains passing over these wheels carriers 25 have been provided. The chain wheels are driven by a driving device not represented in the drawing, so that the carriers move into the direction indicated by arow A. The bottles supplied at 17 are transported downwards by the carriers along the front wall. During this transport the air escapes from the bottles and is replaced by hot water with which the tank is filled. The bottles are subsequently driven along oblique wall 18 to outlet 19. To the tank hot water is supplied at 5, while at 7 cooler water is drained off. Further, lines for the supply of steam may be present running into the water bath. The control hereof is effected by means of a thermostat. As explained hereinbefore, the outlet of the tank contains shrunk bottles and loose objects that had been stuck to the bottles supplied.

The mixture carried off is deposited at the upper end on an inclined vibrating screen 8. Using a driving device 26, the screen is so moved that, when in the vibrating motion the screen deck is in its highest position, the component of motion parallel to the screen deck is directed towards the highest point of the screen. In this movement the containers and any base cups will move, rolling and jumping, down the screendeck and will find their way into receptacle 14. Owing to their flat shape, the labels that have become detached will continue to be in contact with the screen deck and will move jerkily upwards along the screen deck until they reach the top edge and are carried off at 9. The water that has passed through the screen deck is received in a container 27 and returned through line 12 to the heating device for liquids 6. Water carried off with the products separated off is supplied at 28.

In the treatment of used bottles of polyethyleneterephthalate very good results were acheived. For gluing the labels and base cups to the bottles the following types of adhesives of the firm of Delf National Chemie B.V. had been applied.

| Part | Type | Nature of adhesive | Softening temperature °C. |
| --- | --- | --- | --- |
| Labels | 702-9051 C | Vinylacetate copolymer dispersion | 65° C. |
| Base cups | 234-2783 | Hot melt, thermoplastic mixture of resin and wax | 75° C. |

The invention is not limited to the example of the embodiment represented in the drawing. Thus trough-shaped immersion tanks can be used also, provided care is taken that the containers are long enough, i.e. at least 1 min., in contact with the hot liquid. Cylindrical immersion tanks, too, can be used, the transport being effected, for instance, with a screw conveyor. The walls of the immersion tank can be insulated to reduce the loss of heat. The screen may also be a slotted screen. The labels will then pass through the slots and be caught by a screen having a mesh for the removal of water placed under the slotted screen. In this case a shaking screen, too, can be used, instead of a vibrating screen.

EXAMPLE

Bottles from bales of compressed polyethyleneterephthalate bottles with labels and base cups, however without metal caps, are supplied at a rate of 250 kg/hour to the device according to the invention. The water bath having a content of about 1.5 m³ has been brought to boiling temperature by means of a heat exchanger and by the direct influx of superheated steam of 120° C. The speed of the chain with carriers is such that the residence time of the containers in the water bath is 1.5 min. The labels and base cups that have already become detached from the bottles in the water bath are brought onto the vibrating screen together with the bottles. The labels are carried off as a thin layer at the highest point of the screen, while the bottles and the base cups roll down. The base cups can be separated from the bottles, if necessary, through suitable holes at the bottom end of the screen. In order to obtain a high-quality and pure end product a station can be provided where metal parts or base cups yet present in the flow of bottles are removed, visually or automatically, before subjecting the bottles to a further treatment.

We claim:

1. Process for removing objects such as labels from molecularly oriented plastic containers comprising (1) immersing one or more plastic containers in a liquid bath, the temperature of which is at least as high as the molecular disorientation temperature of the plastic and the softening temperature of any adhesive which fastens the objects to the containers and (2) mechanically separating the removed objects from the plastic containers by means of a vibrating surface to which the removed objects and plastic containers are supplied after leaving the liquid immersion bath.

2. The process according to claim 1, wherein the liquid bath is a water bath and the temperature of the liquid bath is at least 70° C.

3. The process according to claim 2, wherein the temperature of the water bath is about 100° C.

4. The process according to claim 1, wherein the liquid bath is a water bath and the process further comprises supplying superheated steam to the water bath.

5. The process according to claim 1, wherein the vibrating surface includes an inclined vibrating screen to which the removed objects and plastic containers are supplied after leaving the liquid immersion bath.

6. A device for carrying out the process according to claim 1, comprising (1) an immersion tank provided with a feed for the plastic containers and an outlet for the plastic containers and removed objects, (2) means for maintaining a liquid bath in the immersion tank at a desired temperature, and (3) means for mechanically separating the removed objects from the plastic containers, said means being in communication with said immersion tank outlet.

7. The device according to claim 6, wherein the immersion tank has an essentially triangularly-shaped vertical cross-section with the plane which bisects one angle of the triangle being oriented vertically; the immersion tank being provided with means for conveying the plastic containers from the feed, which is positioned at the top of one oblique wall of the immersion tank, to the outlet, which is positioned at the top of the other oblique wall of the immersion tank, through a channel formed by the two oblique walls and two planar gratings which are positioned parallel to the two oblique walls.

8. The device according to claim 7, wherein said conveying means comprises three chain wheels positioned at the vertices of the triangularly-shaped immersion tank and a chain of carriers which travel in a triangular path around said chain wheels.

9. The device according to claim 6, wherein the means for mechanically separating the removed objects from the plastic containers comprises an inclined vibrating screen deck which is positioned such that the removed objects and plastic containers exiting the outlet of the immersion tank are deposited near the top of the incline, and which inclined screen deck vibrates such that when the screen deck is in its highest position, the component of motion parallel to the screen deck is directed toward the highest point of the screen.

10. The device according to claim 7, wherein the means for separating the removed objects from the plastic containers comprises an inclined vibrating screen deck which is positioned such that the removed objects and plastic containers exiting the outlet of the immersion tank are deposited near the top of the incline, and which inclined screen deck vibrates such that when the screen deck is in its highest position, the component of motion parallel to the screen deck is directed toward the highest point of the screen.

11. A device for carrying out a process for removing objects such as labels from molecular oriented plastic containers including (1) immersing one or more plastic containers in a liquid bath, the temperature of which is at least as high as the molecular disorientation of the plastic and the softening temperature of any adhesive which fastens the objects to the containers and (2) mechanically separating the removed objects from the plastic containers, the device comprising (1) an immersion tank provided with a feed for the plastic containers and an outlet for the plastic containers and removed objects, the immersion tank having an essentially triangularly-shaped vertical cross-section with the plane which bisects one angle of the triangle being oriented vertically, the immersion tank being provided with means for conveying the plastic containers from the feed, which is positioned at the top of one oblique wall of the immersion tank, to the outlet, which is positioned at the top of the other oblique wall of the immersion tank, through a channel formed by the two oblique walls and two planar gratings which are positioned parallel to the oblique walls, (2) means for maintaining a liquid bath in the immersion tank at a desired temperature, and (3) means for mechanically separating the removed objects from the plastic containers, said means being in communication with said immersion tank outlet.

12. The device according to claim 11, wherein said conveying means comprises three chain wheels positioned at the vertices of the triangularly-shaped immersion tank and chain of carries which travel in a triangular path round said chain wheels.

* * * * *